United States Patent
Himmel et al.

(10) Patent No.: US 6,715,086 B1
(45) Date of Patent: Mar. 30, 2004

(54) DATA PROCESSING SYSTEM AND METHOD HAVING TIME-SPAN SUPPORT FOR INPUT DEVICE DRIVER

(75) Inventors: Maria Azua Himmel, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,303

(22) Filed: Jun. 30, 1999

(51) Int. Cl.$^7$ ................................................ H04L 9/00
(52) U.S. Cl. .................. 713/202; 713/500; 713/501; 327/263; 327/265; 341/23; 341/26; 341/29
(58) Field of Search ................................ 713/202, 500, 713/501; 327/263, 265; 341/23, 26, 29

(56) References Cited

U.S. PATENT DOCUMENTS

| | | | |
|---|---|---|---|
| 3,753,007 A | 8/1973 | Viswanathan | 307/247 |
| 4,190,967 A | 3/1980 | Ruegg et al. | 35/6 |
| 4,502,039 A | 2/1985 | Vercesi et al. | 340/365 |
| 4,891,786 A * | 1/1990 | Goldwasser | 364/900 |
| 5,161,190 A | 11/1992 | Cairns | 380/23 |
| 5,430,841 A | 7/1995 | Tannenbaum et al. | 395/164 |
| 5,457,455 A | 10/1995 | Lee | 341/24 |
| 5,459,462 A | 10/1995 | Venkidu et al. | 341/22 |
| 5,649,230 A | 7/1997 | Lentz | 395/872 |
| 5,701,444 A | 12/1997 | Baldwin | 395/506 |
| 5,742,287 A | 4/1998 | Lection et al. | 345/355 |
| 5,862,472 A | 1/1999 | Park | 455/411 |
| 5,875,345 A | 2/1999 | Naito et al. | 395/750.05 |

OTHER PUBLICATIONS

JP7311715—Abstract only.
JP63118919—Abstract only.
JP63020680—Abstract only.
CN1129826—Abstract only.

* cited by examiner

*Primary Examiner*—Gregory Morse
*Assistant Examiner*—Paul Callahan
(74) *Attorney, Agent, or Firm*—David A. Mims, Jr.; Bracewell & Patterson, L.L.P.

(57) ABSTRACT

A time-enhanced input device driver for a data processing system is capable of generating time-enhanced output in response to input signals. The input device driver receives a first input-event signal followed by a second input-event signal. In response to the second input-event signal, the input device driver generates a character code and an associated time-span code. The time-span code reflects the amount of time that separated the first input-event signal from the second. In an illustrative embodiment, the first and second input-event signals may comprise a key-down signal from a particular key on a keyboard and a key-up signal from that key respectively, in which case the generated character code would correspond to that key. Alternatively, the first input-event signal may comprise a key-up signal or a start signal from a program, and the second input-event signal may comprise a key-down signal or an entry-complete signal, in which case the generated character code would comprise a pause character code, provided sufficient time separated the first input-event signal from the second.

20 Claims, 4 Drawing Sheets

DATA PROCESSING SYSTEM AND METHOD HAVING TIME-SPAN SUPPORT FOR INPUT DEVICE DRIVER

BACKGROUND OF THE INVENTION

1. Technical Field

The present invention relates in general to data processing systems that accept input from input devices and in particular to methods and systems for translating signals from an input device into codes that are recognizable to application programs. Still more particularly, the present invention relates to a method, a system, and a program product capable of translating input signals into codes that describe the temporal characteristics of the input activity.

2. Description of the Related Art

In a conventional data processing system, every time a key on the keyboard of the data processing system is depressed or released, the keyboard generates a key code uniquely identifying the manipulated key. However, application programs are generally designed to process character codes, not key codes. Consequently, conventional data processing systems include a keyboard driver that receives the key codes from the keyboard, translates those key codes into character codes, and provides those character codes to the application programs. For example, if an operator were to depress a "Shift" key, then depress and release the "A" key, and then release the "Shift" key, the keyboard would transmit the following key codes: a key-down signal for the "Shift" key, a key-down signal for the "A" key, a key-up signal for the "A" key, and then a key-up signal for the "Shift" key. After receiving that sequence of key codes, a conventional keyboard driver would transmit the character code that represents an uppercase "A" to the application program that is currently active.

The character codes produced by conventional keyboard drivers are useful for many applications. For example, conventional applications that provide password protection implement passwords as sequences of character codes. However, in recognition of the limited size of the set of conventional character codes, in an effort to ensure a reasonable level of protection from unauthorized access, applications typically impose a minimum password length, and users are commonly encouraged to adopt passwords longer than the minimum. The primary disadvantage associated with long passwords, however, is that they are generally more inconvenient to enter than shorter ones. It is therefore evident that a problem is presented by the limited size of the set of character codes produced by conventional keyboard drivers.

In addition, passwords built solely from conventional character codes are likely to be actual words. Passwords made of words, however, are generally less secure than passwords with additional elements. For example, a password that is a common English word can be cracked by attempting passwords from an English dictionary of less than 20,000 words. By contrast, cracking a password that cannot be found in a dictionary might require many times that number of attempts using random sequences of elements.

SUMMARY OF THE INVENTION

To address these shortcomings and provide an enhanced data processing system, the present invention furnishes a method, system, and program product capable of receiving a first input-event signal followed by a second input-event signal. In response to the second input-event signal, the present invention generates a character code and an associated time-span code. The time-span code reflects the amount of time that separated the first input-event signal from the second.

In an illustrative embodiment, the first and second input-event signals may comprise a key-down signal from a particular key on a keyboard and a key-up signal from that key respectively, in which case the generated character code would correspond to that key. Alternatively, the first input-event signal may comprise a key-up signal or a start signal from a program, and the second input-event signal may comprise a key-down signal or an entry-complete signal, in which case the generated character code would comprise a pause character code, provided sufficient time separated the first input-event signal from the second.

All objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
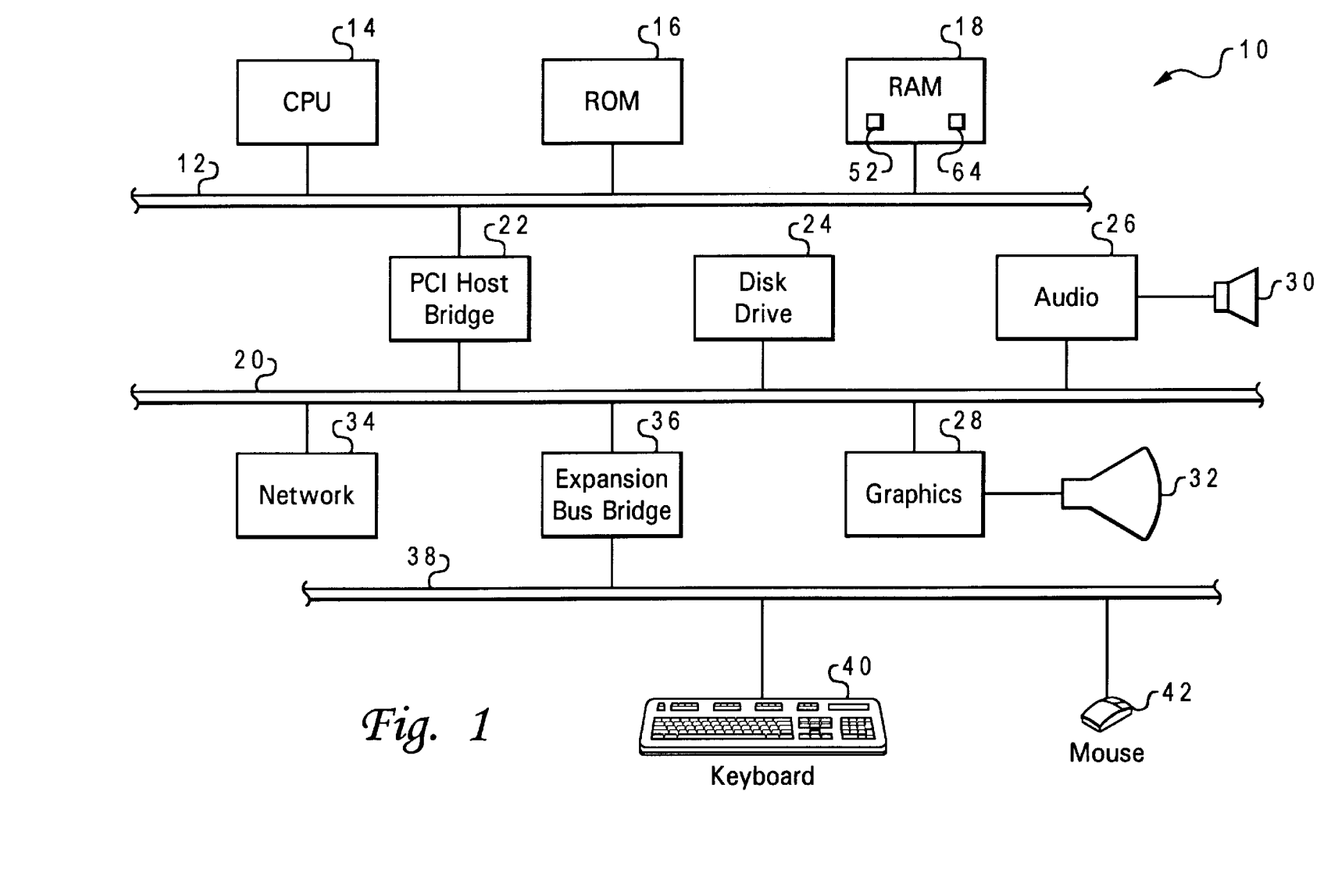
FIG. 1 is a block diagram of an illustrative embodiment of a data processing system that generates and processes time-enhanced keyboard data according to the present invention.

With reference now to the figures and in particular with reference to FIG. 1, there is depicted an illustrative embodiment of a data processing system 10 that provides time-enhanced keyboard data in accordance with the present invention. As shown, data processing system 10, which may comprise a personal computer, for example, includes a system bus 12 that is connected to a central processing unit (CPU) 14 and to memory, including read only memory (ROM) 16 and random access memory (RAM) 18. CPU 14 and the memory are also coupled to a PCI local bus 20 of data processing system 10 through a PCI host bridge 22. PCI local bus 20 is also connected to additional permanent data storage devices, such as one or more disc drives 24, and to an audio adapter 26 and a graphics adapter 28 for controlling audio output through a speaker 30 and visual output through a video display 32, respectively. A communications adapter 34 for connecting data processing system 10 to a local area network (not illustrated) is also attached to PCI local bus 20.

A PCI-to-ISA bus bridge, such as expansion bus bridge 36, couples ISA bus 38 to PCI local bus 20. As illustrated, a keyboard 40 and a mouse 42 are connected to ISA bus 36 to support certain basic I/O functions, such as password entry. When the keys on keyboard 40 are depressed or released, keyboard 40 responds by transmitting key codes identifying the keys depressed or released to ISA bus 36.

Data processing system 10 also includes a number of software programs that are stored on the data storage devices and loaded into RAM 18 and then into CPU 14 for execution. Among those programs is a screen saver program 52 that provides password protection and a keyboard driver 64 that converts the key codes from keyboard 40 into codes that are more useful to application programs such as a word processors and screen saver programs.

Figure 2:
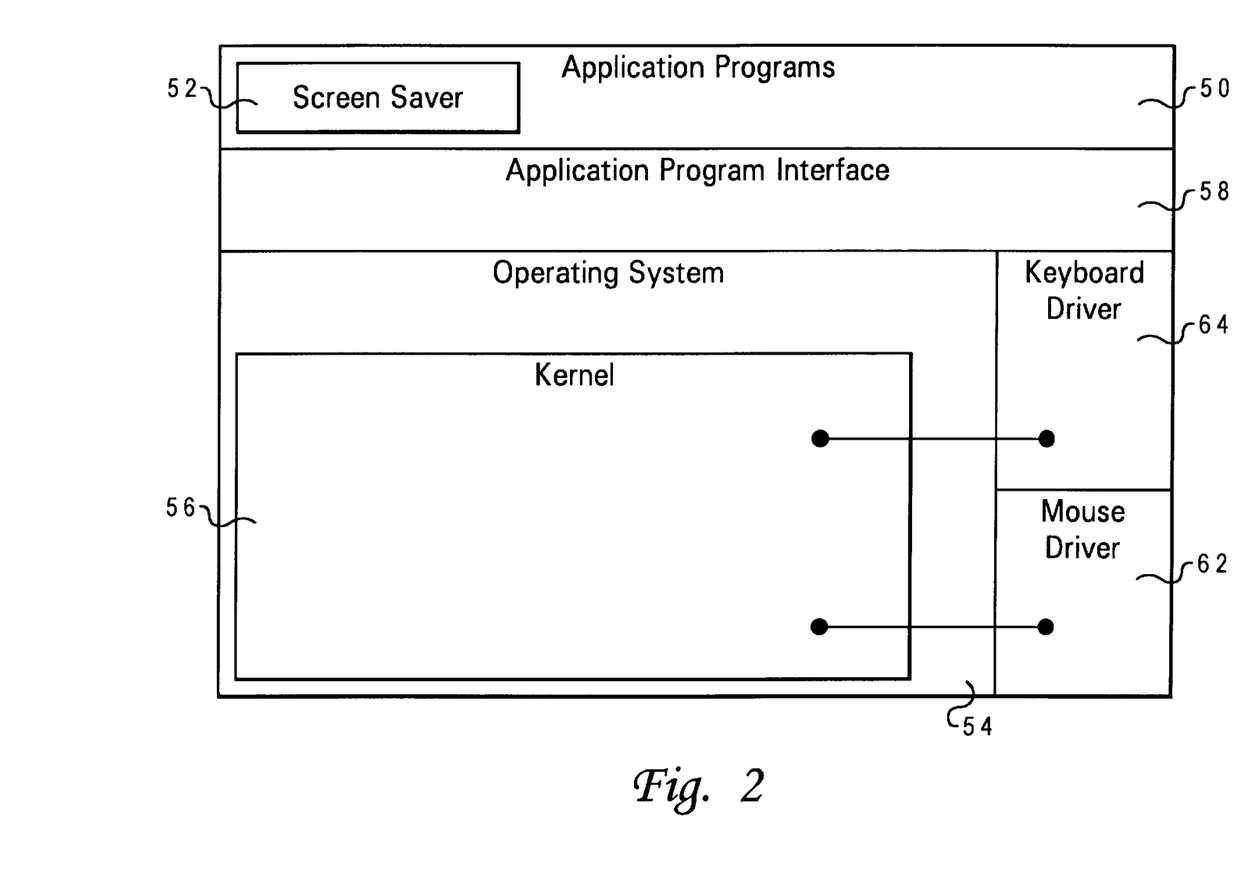
FIG. 2 is a layer diagram of the programs in the data processing system of FIG. 1 that cooperate to provide support for time-enhanced keyboard data according to the present invention.

Referring now also to FIG. 2, there is depicted a layer diagram of the software programs residing in data processing system 10 that cooperate to translate keystrokes into data. At the highest level of the diagram are the application programs 50 of data processing system 10, including screen saver program 52. At the intermediate level is an application program interface 58 that application programs 50 utilize to direct the performance of procedures by the operating system 54.

Operating system 54, which occupies the lowest level of the diagram, manages the operation of data processing system 10 by performing duties such as task management. Included in operating system 54 is a kernel 56 that manages the memory, files, and peripheral devices of data processing system 10. The lowest level also includes device drivers which are used by kernel 56 to manage input from and output to peripheral devices. In particular, kernel 56 uses a video device driver (not illustrated) to direct video output to display monitor 32, a mouse driver 62 to process input from mouse 42, and keyboard driver 64 to process input from keyboard 40. One of the main functions of keyboard driver 64 is translating key codes into character codes.

In the illustrative embodiment of the present invention, keyboard driver 64 provides two translation modes: a standard mode and a time-enhanced mode. When operating in the standard mode, keyboard driver 64 uses conventional protocols to translate the key codes generated by keyboard 40 into character codes.

When in the time enhanced mode, keyboard driver 64 generates time-enhanced output, i.e., output that denotes, in addition to which keys were depressed and released, the time interval that has elapsed between the receipt of adjacent key codes. Keyboard driver 64 communicates that time interval to registered application programs by transmitting a supplemental time-span code along with the corresponding character code. The time-span code represents the number of seconds, or other predetermined pause-duration units, for which the key corresponding to the character code was depressed. Pauses between keystrokes are represented by a new character code, called a pause character code, which is transmitted along with a time-span code to denote the number of seconds, or other predetermined pause-duration units, that passed while no key was depressed.

Keyboard driver 64 also utilizes a proximity value that sets a margin of acceptable error in the timing of keystrokes. Keyboard driver 64 provides default values for the pause-duration unit and the proximity value and allows application programs to override those defaults through parameters passed to keyboard driver 64 when setting keyboard driver 64 to time-enhanced mode.

Figure 3:
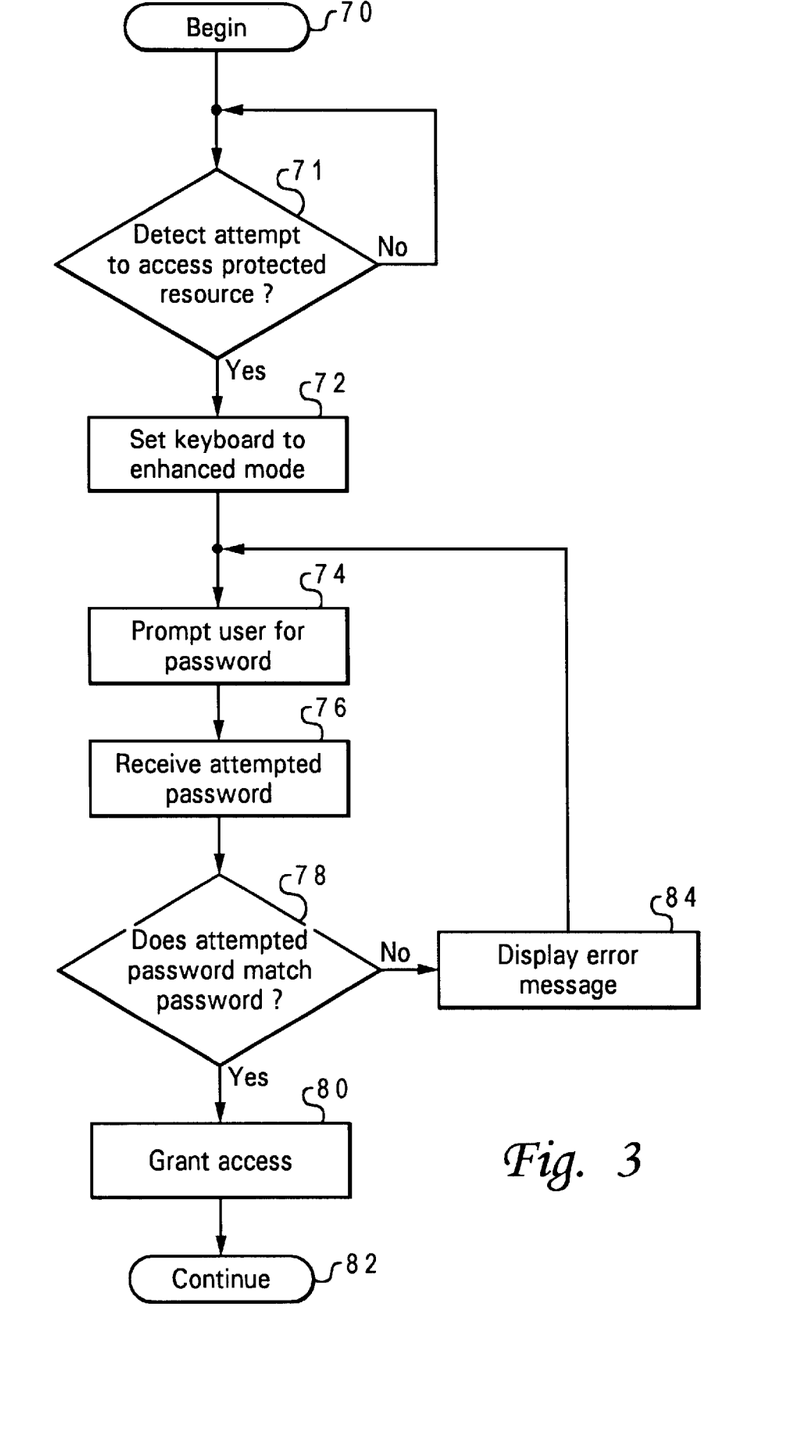
FIG. 3 is a logical flowchart depicting the process by which an illustrative application provides password protection in accordance with the present invention.

With reference now to FIG. 3, there is depicted an exemplary password validation process for screen saver program 52 that supports time-enhanced keyboard data in accordance with the present invention. While data processing system 10 is being used by an operator, screen saver program 52 remains in a dormant mode of operation. When screen saver program 52 is in the dormant mode, the operator of the data processing system may specify a password that will be required to inactivate screen saver program 52 once it has been activated.

If no input is received by data processing system 10 for a predetermined interval of time, screen saver program 52 is aroused out of the dormant mode and activated. Upon activation, screen saver program 52 protects the data in data processing system 10 by preventing any application programs 50 other than screen saver program 52 from executing until the password has been entered.

The process shown in FIG. 3 begins at block 70 with screen saver program 52 in the active mode. When active, screen saver program 52 monitors keyboard driver 64 and mouse driver 62 to detect an attempt to access a protected resource (i.e., data processing system 10), as illustrated at block 71. Upon detecting input from either keyboard driver 64 or mouse driver 62, screen saver program 52 sets keyboard driver 64 to time-enhanced mode and sets the pause-duration unit to 1 second and the proximity value to 0.1 second, as shown at block 72. As illustrated at block 74, keyboard driver 64 then prompts the operator for a password. The prompt can take the form of a window displayed on display monitor 32 containing text instructing the operator to enter a password, a field within which the password may be typed, and a button labeled "OK" to be clicked with mouse 42 to indicate that password entry is complete.

As explained in greater detail below, block 76 represents the actions that are taken by data processing system 10 when the operator responds to the prompt by entering an attempted password utilizing keyboard 40 and then pressing "Enter" or using mouse 42 to click on the "OK" button.

Once screen saver program 52 has received the attempted password, execution passes to block 78, which shows the password and the attempted password being compared. As illustrated at block 80, if the password and the attempted password match, access to data processing system 10 is granted by returning screen saver program 52 to its dormant mode and restoring data processing system 10 to the state that preceded the activation of screen saver program 52. thereafter, processing continues at block 82. If, however, the password and the attempted password do not match, an error message is displayed, as shown at block 84, and screen saver program 52 continues to run to the exclusion of other applications, thus preventing the operator from accessing the resources of data processing system 10.

Figure 4:
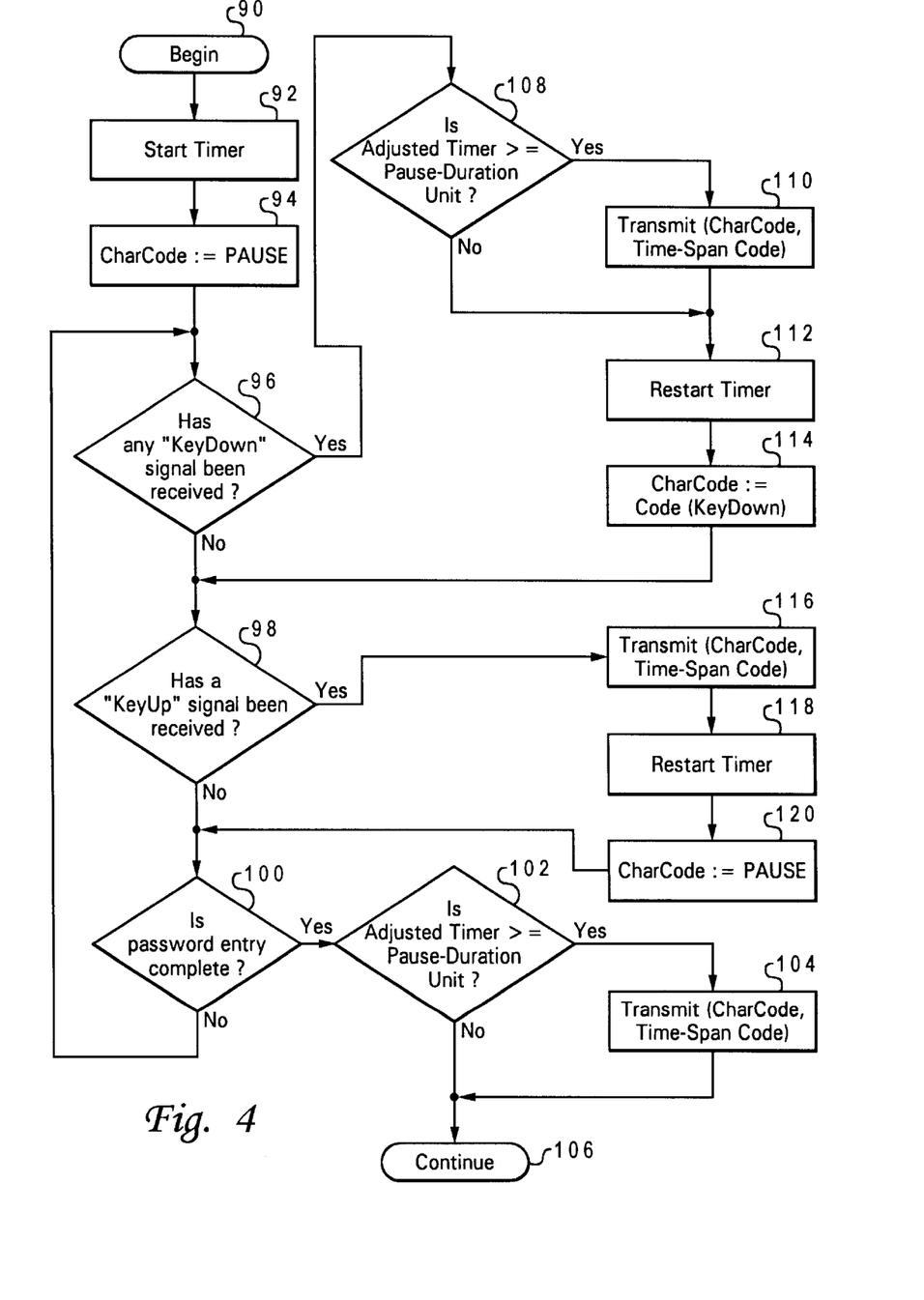
FIG. 4 is a logical flowchart that illustrates the step of receiving a password shown in FIG. 3 in greater detail.

FIG. 4 expands upon block 76 of FIG. 3, providing a detailed illustration the time-enhanced mode of operation of keyboard driver 64 in relation to transmitting the attempted password to screen saver program 52. In particular, FIG. 4 illustrates how keyboard driver 64 generates pause character codes in response to significant pauses between keystrokes and time-span codes that reflect the temporal length of the keystrokes and the pauses.

As illustrated, the process begins at block 90, in response to receiving a start signal, such as a signal sent by screen saver program 52 to keyboard driver 64 upon display of the password prompt. The process then proceeds through blocks 92 and 94, which depict keyboard driver 64 starting a timer and initializing CharCode, a variable indicating which character code is currently being built, to PAUSE to indicate that no keys on keyboard 40 are currently depressed. The process then proceeds to block 96, thereby entering an input loop formed by the path through the "NO" branches of blocks 96, 98, and 100 to wait for input from the operator.

In a first example, the operator responds to the password prompt by depressing no keys on keyboard 40 but simply clicking the "OK" button 5.1 seconds after the prompt was displayed. During the time separating the display of the prompt and the click on the "OK" button, keyboard driver 64 repeatedly executes the input loop. That is, the "NO" branch of block 96 is followed to block 98, as no key-down signal was received. Next, the "NO" branch of block 98 is followed to block 100, as no key-up signal was received. Then, each time execution reaches block 100 but the operator has not yet clicked on the "OK" button, the "NO" branch of block 100 is followed back up to block 96, where execution of the tests for input commences again.

When the operator eventually clicks on the "OK" button with mouse 42, a password-entry complete signal is transmitted to keyboard driver 64. When execution of the input loop thereafter reaches block 100, the "YES" branch is followed to block 102, which illustrates keyboard driver 64 determining whether the pause preceding the receipt of the entry-complete signal was of sufficient length that a character code representing a pause should be generated. In the first example, keyboard driver 64 adds the specified proximity value of 0.1 second to the timer value of 5.1 seconds to derive an adjusted timer value of 5.2 seconds. Keyboard driver 64 then compares the adjusted timer value with the specified pause-duration unit of 1 second. Since the adjusted timer value at least equals the pause-duration unit, the "YES" branch is followed to block 104, which illustrates the generation of a pause character code and an associated time-span code.

At block 104 keyboard driver 64 divides the adjusted timer value of 5.2 seconds by the pause-duration unit of 1 second, with any remainder discarded, to produce an adjusted pause duration of 5 units. A pause character code and a time-span code corresponding to 5 pause-duration units are then transmitted to screen saver program 52. Execution then flows through block 106 of FIG. 4 to block 78 of FIG. 3. As described above, at block 78, the attempted password is compared with the password of screen saver program 52. If the password consists of a pause character code and a time-span code corresponding to 5 pause-duration units, access will be granted; otherwise, access will be denied.

Referring again to block 90 of FIG. 4, a second password validation example will now be described illustrating the successful entry of a password consisting of the following sequence of components: the character code that represents a lower case "C" with a time-span code corresponding to 0 pause-duration units, the pause character code with a time-span code corresponding to 1 pause-duration unit, the character code that represents a lower case "B" with a time-span code corresponding to 2 pause-duration units, and the pause character code with a time-span code corresponding to 3 pause-duration units.

The process begins at block 90 and proceeds through blocks 92 and 94 to block 96 with keyboard driver 64 receiving a start signal and initiating the timer and CharCode variable as described above. In the second example, 0.7 second after the start signal is received, the operator depresses the "C" key, which causes keyboard 40 to transmit an input-event signal comprising a key-down key code for the "C" key to keyboard driver 64. For the period of time preceding the receipt of that key-down signal, keyboard driver 64 will have been executing the input loop formed by blocks 96, 98, and 100. After the key-down signal has been received, the process proceeds along the "YES" branch of block 96 to block 108, which illustrates a determination of whether a pause character code should be generated for the leading pause, given the pause-duration unit and proximity value parameters specified earlier.

Thus, at block 108 keyboard driver 64 adds the proximity value of 0.1 second to the timer value of 0.7 second to derive an adjusted timer value of 0.8 second. Keyboard driver 64 then compares the adjusted timer value with the specified pause-duration unit of 1 second. Since the adjusted timer value is less than the pause-duration unit, a pause character code is not generated. Instead, the timer is restarted at block 112, and the process passes to block 114. At block 114, keyboard driver 64 determines that the character code for the lower case "C" corresponds to the received key code and therefore loads that character code into CharCode. Block 98 is then entered, and, since the "C" key will not have been released yet, execution of the input loop resumes.

In the second example, the operator releases the "C" key 0.5 second after it was depressed, which causes keyboard 40 to send a key-up key code for the "C" key to keyboard driver 64. Once keyboard driver 64 receives that signal, the process passes from block 98 to block 116. At block 116, keyboard driver 64 divides the adjusted timer value of 0.6 second by the pause-duration unit of 1 second to produce an adjusted pause duration of 0 units. A time-span code corresponding to 0 units is then transmitted to screen saver program 52 along with the character code for the lower case "C" that is stored in CharCode. The timer then is restarted at block 118, and CharCode is set to PAUSE at block 120. The process thereafter returns to the input loop through block 100.

The operator in the present example then depresses the "B" key 0.9 second after releasing the "C" key, thereby causing the keyboard to send a key-down key code for the "B" key to keyboard driver 64. Upon receipt of that key code, keyboard driver 64 exits the input loop through block 96 and enters block 108, wherein the proximity value of 0.1 second is added to the timer value of 0.9 second to derive an adjusted timer value of 1.0 second. The adjusted timer value is then compared with the pause-duration unit of 1 second, and, since the adjusted timer value at least equals the pause-duration unit, execution passes to block 110. There, keyboard driver 64 divides the adjusted timer value of 1.0 second by the pause-duration unit of 1 second to produce an adjusted pause duration of 1 unit. A time-span code corresponding to 1 unit is then transmitted to screen saver program 52 along with the pause character code that is stored in CharCode. The timer is then restarted at block 112, and the process passes to block 114, which depicts keyboard driver 64 interpreting the received key code and loading the character code for the lower case "B" into CharCode. Execution then returns to the input loop through block 98.

In the present example, 2.0 seconds after depressing the "B" key, the operator releases the "B" key. A corresponding key-up key code is transmitted to keyboard driver 64, which causes the process to pass through the "YES" branch of block 98 into block 116. An adjusted timer value of 2.1 seconds is then computed and divided by the pause-duration unit of 1 second to derive an adjusted pause duration of 2 units. Consequently, a corresponding time-span code is transmitted to screen saver program 52, along with the character code for the lower case "B." Execution then passes to blocks 118 and 120, wherein the timer is reset and CharCode is set to PAUSE, and returns to the input loop through block 100.

Finally, 3.1 seconds after releasing the "B" key, the operator uses mouse 42 to click the "OK" button displayed with the password prompt to indicate that password entry is complete. In response, screen saver program 52 transmits an input-event signal comprising an entry-complete signal to keyboard driver 64. The entry-complete signal causes keyboard driver 64 to exit the input loop through the "YES" branch of block 100 and enter block 102. There, an adjusted timer value of 3.2 seconds is computed and found to be at least equal to the predetermined pause-duration unit. Execution consequently flows through the "YES" branch to block 104, wherein keyboard driver 64 divides the adjusted timer value by the pause-duration unit to derive an adjusted pause duration of 3 units. Keyboard driver 64 then transmits a corresponding time-span code together with the pause character code from CharCode to screen saver program 52 and then returns at block 106 to block 78 of FIG. 3. At block 78, screen saver program 52 determines that the attempted password matches the password, and, in response to this determination, enters the dormant mode of operation at block 82 to allow access to data processing system 10, as described above.

In accordance with the present invention, the set of possible password elements is increased by the addition of the pause character code and by the addition of time-span character codes of varying value. By increasing the size of the set of possible valid password elements, the present invention enables application programs to increase the difficulty associated with cracking passwords without requiring the user to enter longer passwords, thereby enhancing protection against unauthorized users without increasing the inconvenience to authorized users. The present invention can also make discovery of valid passwords through observation more difficult, in that an unauthorized user would need to determine not only which keys were depressed, but also how long each key was depressed and how much time passed between keystrokes.

While the invention has been particularly shown and described with reference to an illustrative embodiment, it will be understood by those skilled in the art that various changes in form and detail may be made therein without departing from the spirit and scope of the invention. For example, although the illustrative embodiment relates to a screen saver program, any other program that provides password protection, including network administration software and operating system software, could utilize the time-enhanced output described. Accordingly, the present invention could easily be used to protect data and other resources of a computer network.

Moreover, other types of applications could be made more useful if designed to take advantage of the time-enhanced output of the present invention. For example, a program designed to improve typing skills could use the output generated by the present invention to ascertain an operator's skill level and could therefore dynamically tailor typing lessons to that skill level.

In addition, although the present invention has been described in connection with a data processing system receiving input from a conventional alphanumeric keyboard, those with ordinary in skill in the art will appreciate that the inventive concepts herein revealed could easily be used to translate input from other types of keyboards or input devices into time-enhanced output. Among the types of devices from which input could be accepted are numeric keypads, such as those used by automated teller machines (ATMs) to receive personal identification numbers (PINs) before disbursing funds from a bank account and by premises security systems to receive PINs before granting physical access to a protected building or room. Also included are keyboards that are only temporarily connected to a data processing system, such as the keyboard of a touch-tone telephone. Furthermore, the present invention could easily by utilized to generate time-enhanced data that corresponds to input entered by means of touch screens, light pens, and pointing devices such as mice. Accordingly, wherever not otherwise clearly dictated by the context, references herein to keyboards should be understood to include any type of device that can cause a signal to be transmitted to a data processing system in response to manipulation of the device by an operator.

Furthermore, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of converting input signals into character codes in a data processing system, said method comprising:

receiving a password, wherein said password includes at least one character code and at least one time-span code;

receiving a first input-event signal, wherein said first input-event signal comprises one of a key-up signal from said keyboard and a start signal from a program capable of processing said character code and said time-span code;

receiving a second input-event signal after an interval of time has elapsed since said first input-event signal was received, wherein said second input-event signal comprises one of a key-down signal from said keyboard and an entry-complete signal from said program;

in response to said second input-event signal, generating a character code and a time-span code when said interval has a duration greater than a predetermined pause duration, said time-span code corresponding to a duration of said interval; and confirming that the generated character code and time-span code matches the at least one character code and at least one time-span code, respectively, of the password.

2. The method of claim 1 wherein:

said first input-event signal comprises a key-down signal from a keyboard in communication with said data processing system, said key-down signal indicating that a particular key on said keyboard has been depressed;

said second input-event signal comprises a key-up signal from said keyboard, said key-up signal indicating that said particular key has been released; and said generated character code corresponds to said particular key.

3. The method of claim 1 wherein:

said first input-event signal comprises one of a key-up signal from a keyboard in communication with said data processing system and a start signal from a program capable of processing said character code and said time-span code;

said second input-event signal comprises one of a key-down signal from said keyboard and an entry-complete signal from said program;

said interval has a duration substantially equal to or greater than a predetermined pause duration; and said generated character code comprises a pause character code.

4. The method of claim 1, said data processing system in communication with a keyboard, wherein:

said first input-event signal comprises one of a leading key-down signal from said keyboard indicating that a particular key on said keyboard has been depressed, a leading key-up signal from said keyboard indicating that a particular key on said keyboard has been released, and a start sign from a program capable of processing said character code and said time-span code;

said second input-event signal comprises one of a trailing key-up signal from said keyboard indicating that said depressed key has been released, a trailing key-down signal from said keyboard, and an entry-complete signal from said program;

said generated character code corresponds to said depressed key if said first input event signal comprises said leading key-down signal and said second input-event signal comprises said trailing key-up signal; and said generated character code comprises a pause character code if said first input event signal comprises one of said leading key-up signal and said start signal, said second input-event signal comprises one of said trailing key-down signal and said entry-complete signal, and said interval is greater than a predetermined pause duration.

5. The method of claim 1 wherein said time-span code comprises a largest multiple of a predetermined pause duration that does not exceed a sum comprising said duration of said interval plus a predetermined proximity value.

6. The method of claim 5, wherein said method is activated by a program capable of processing said character code, said time-span code, and said pause character code, said method further comprising:

receiving said predetermined pause duration and said predetermined proximity value from said program.

7. A program product that converts input signals into character codes for a data processing system, said program product comprising:

a password receiver that receives a password, wherein said password includes at least one character code and at least one time-span code;

a signal detector for receiving a first input-event signal and a second input-event signal following said first input-event signal by an interval of time, wherein said first input-event signal comprises one of a key-up signal from said keyboard and a start signal from a program capable of processing said character code and said time-span code and said second input-event signal comprises one of a key-down signal from said keyboard and an entry-complete signal from said program;

a timer for measuring a duration of said interval;

a character code generator for producing a character code in response to said second input-event signal, a time-span code generator for producing a time-span code corresponding to said duration when said duration is substantially equal to or greater than a predetermined pause duration;

a password confirmer that confirms that the generated character code and time-span code matches the at least one character code and at least one time-span code, respectively, of the password; and a computer usable medium encoding said signal detector, said timer, said character code transmitter, said time-span code transmitter, said password receiver and said password confirmer.

8. A program product according to claim 7, wherein:

said first input-event signal comprises a key-down signal from a keyboard in communication with said data processing system, said key-down signal indicating that a particular key on said keyboard has been depressed;

said second input-event signal comprises a key-up signal from said keyboard, said key-up signal indicating that said particular key has been released; and said character code produced by said character code generator corresponds to said particular key.

9. A program product according to claim 7, wherein:

said first input-event signal comprises one of a key-up signal from a keyboard in communication with said data processing system and a start signal from a program capable of processing said character code and said time-span code;

said second input-event signal comprises one of a key-down signal from said keyboard and an entry-complete signal from said program;

said interval has a duration substantially equal to or greater than a predetermined pause duration; and said character code produced by said character code generator comprises a pause character code.

10. A program product according to claim 7, said data processing system in communication with a keyboard, wherein:

said first input-event signal comprises one of a leading key-down signal from said keyboard indicating that a particular key on said keyboard has been depressed, a leading key-up signal from said keyboard indicating that a particular key on said keyboard has been released, and a start signal from a program capable of processing said character code and said time-span code;

said second input-event signal comprises one of a trailing key-up signal from said keyboard indicating that said depressed key has been released, a trailing key-down signal from said keyboard, and an entry-complete signal from said program;

said character code produced by said character code generator corresponds to said depressed key if said first input event signal comprises said leading key-down signal and said second input-event signal comprises said trailing key-up signal; and said character code produced by said character code generator comprises a pause character code if said first input event signal comprises one of said leading key-up signal and said start signal, said second input-event signal comprises one of said trailing key-down signal and said entry-complete signal, and said interval has a duration substantially equal to or greater than a predetermined pause duration.

11. A program product according to claim 10, wherein, following a prompt for a password, said character code generator and said time-span code generator cooperate to produce a password comprising at least one character code and at least one time-span code.

12. A program product according to claim 7, wherein said time-span code comprises a largest multiple of a predetermined pause duration that does not exceed a sum comprising said duration of said interval plus a predetermined proximity value.

13. A program product according to claim 12, wherein said program product is activated by a program capable of processing said character code, said time-span code, and said pause character code, said program product further comprising:
input parameters for receiving said predetermined pause duration and said predetermined proximity value from said program.

14. A data processing system that utilizes time-enhanced input, said data processing system comprising:
a processor and a memory in communication with said processor;
an input device in communication with said processor;
an input driver in said memory and executable by said processor, said input driver including:
a password receiver that receives a password wherein said password, includes at least one character code and at least one time-span cod;
a signal detector for receiving a first input-event signal and a second input-event signal following said first input-vent signal by an interval of time;
a timer for measuring a duration of said interval;
a character code generator for producing a character code in response to said second input-event signal;
a time-span code generator for producing a time-span code corresponding to said duration; and
a password conformer that confirms that the generated character code and time-span code matches the at least one character code and at least one time-span code, respectively, of the password; and
wherein said first input-event signal comprises one of a key-up signal from said keyboard and a start signal from a program capable of processing said character code and said time-span code; said second input-event signal comprises one of a key-down signal from said keyboard and an entry-complete signal from said program; said interval has a duration greater than a predetermined pause duration; and said character code produced by said character code generator comprises a pause character code.

15. A data processing system according to claim 14, said input device comprising a keyboard, wherein:
said first input-event signal comprises a key-down signal from said keyboard indicating that a particular key on said keyboard has been depressed;
said second input-event signal comprises a key-up signal from said keyboard indicating that said particular key has been released; and
said character code produced by said character code generator corresponds to said particular key.

16. A data processing system according to claim 14, said input device comprising a keyboard, wherein:
said first input-event signal comprises one of a key-up signal from said keyboard and a start signal from a program capable of processing said character code and said time-span code;
said second input-event signal comprises one of a key-down signal from said keyboard and an entry-complete signal from said program;
said interval has a duration substantially equal to or greater than a predetermined pause duration; and
said character code produced by said character code generator comprises a pause character code.

17. A data processing system according to claim 14, said input device comprising a keyboard, wherein:
said first input-event signal comprises one of a leading key-down signal from said keyboard indicating that a particular key on said keyboard has been depressed, a leading key-up signal from said keyboard indicating that a particular key on said keyboard has been released, and a start signal from a program capable of processing said character code and said time-span code;
said second input-event signal comprises one of a trailing key-up signal from said keyboard indicating that said depressed key has been released, a trailing key-down signal from said keyboard, and an entry-complete signal from said program;
said character code produced by said character code generator corresponds to said depressed key if said first input event signal comprises said leading key-down signal and said second input-event signal comprises said trailing key-up signal; and
said character code produced by said character code generator comprises a pause character code if said first input event signal comprises one of said leading key-up signal and said start signal, said second input-event signal comprises one of said trailing key-down signal and said entry-complete signal, and said interval has a duration substantially equal to or greater than a predetermined pause duration.

18. A data processing system according to claim 17, wherein, following a prompt for a password, said character code generator and said time-span code generator cooperate to produce a password comprising at least one character code and at least one time-span code.

19. A data processing system according to claim 14, said input device comprising a keyboard, wherein said time-span code comprises a largest multiple of a predetermined pause duration that does not exceed a sum comprising said duration of said interval plus a predetermined proximity value.

20. A data processing system according to claim 14, said input device comprising a keyboard, wherein said keyboard driver further comprises input parameters for receiving said predetermined pause duration and said predetermined proximity value from a program capable of processing said character code, said time-span code, and said pause character code.

* * * * *

UNITED STATES PATENT AND TRADEMARK OFFICE
CERTIFICATE OF CORRECTION

PATENT NO.    : 6,715,086 B1                                                      Page 1 of 1
DATED         : March 30, 2004
INVENTOR(S)   : Himmel et al.

It is certified that error appears in the above-identified patent and that said Letters Patent is hereby corrected as shown below:

Column 11,
Line 24, please delete "cod;" and replace with -- code; --.

Signed and Sealed this

Fifth Day of July, 2005

JON W. DUDAS
*Director of the United States Patent and Trademark Office*